(12) United States Patent
Abedini et al.

(10) Patent No.: US 10,827,499 B2
(45) Date of Patent: Nov. 3, 2020

(54) TECHNIQUES AND APPARATUSES FOR PRIORITIZATION FOR TRANSMISSION POWER CONTROL IN 5G

(71) Applicant: QUALCOMM Incorporated, San Diego, CA (US)

(72) Inventors: Navid Abedini, Somerset, NJ (US); Junyi Li, Chester, NJ (US); Karl Georg Hampel, Hoboken, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/149,994

(22) Filed: Oct. 2, 2018

(65) Prior Publication Data
US 2019/0132847 A1    May 2, 2019

Related U.S. Application Data

(60) Provisional application No. 62/579,087, filed on Oct. 30, 2017.

(51) Int. Cl.
*H04W 72/04* (2009.01)
*H04W 56/00* (2009.01)
(Continued)

(52) U.S. Cl.
CPC ....... *H04W 72/0473* (2013.01); *H04W 52/28* (2013.01); *H04W 52/38* (2013.01);
(Continued)

(58) Field of Classification Search
CPC ......... H04Q 11/0478; G06F 2209/5021; G06F 9/505; H04L 2012/562; H04L 2012/5651
See application file for complete search history.

(56) References Cited

U.S. PATENT DOCUMENTS 9,807,709 B2 * 10/2017 Deng .................... H04W 92/18
2005/0094585 A1    5/2005 Golden et al.
(Continued)

OTHER PUBLICATIONS

AT&T, et al., "Study on Integrated Access and Backhaul for NR", 3GPP Draft; RP-171880 REVSID_IAB, 3rd Generation Partnership Project (3GPP), Mobile Competence Centre; 650, Route Des Lucioles; F-06921 Sophia-Antipolis Cedex; France, vol. TSG RAN, No. Sapporo, Japan; Sep. 11, 2017-Sep. 14, 2017, Sep. 10, 2017 (Sep. 10, 2017), 6 pages, XP051324447, Retrieved from the Internet: URL: http://www.3gpp.org/ftp/Meetings_3GPP_SYNC/RAN/Docs/ [retrieved on Sep. 10, 2017] the whole document.
(Continued)

*Primary Examiner* — Chandrahas B Patel
(74) *Attorney, Agent, or Firm* — Qualcomm Incorporated

(57) ABSTRACT

Various aspects of the present disclosure generally relate to wireless communication. In some aspects, a control node may determine at least one of a transmission power or a reception power for at least one of a first signal or a second signal to be communicated between a target wireless node and at least one other wireless node based at least in part on a priority level of the first signal relative to the second signal, wherein the transmission power or the reception power is based at least in part on at least one of an identity or state of the target wireless node or the at least one other wireless node, or a type of the first signal or the second signal; and configure the transmission power or the reception power to be used for the first signal or the second signal. Numerous other aspects are provided.

29 Claims, 11 Drawing Sheets

(51) Int. Cl.
*H04W 52/28* (2009.01)
*H04W 52/38* (2009.01)
*H04W 72/12* (2009.01)
*H04W 72/10* (2009.01)
*H04L 1/00* (2006.01)
*H04L 5/00* (2006.01)
*H04B 7/0456* (2017.01)
*H04B 7/06* (2006.01)

(52) U.S. Cl.
CPC ........... *H04W 56/00* (2013.01); *H04B 7/0456* (2013.01); *H04B 7/0617* (2013.01); *H04L 1/0003* (2013.01); *H04L 1/0009* (2013.01); *H04L 5/0048* (2013.01); *H04W 52/383* (2013.01); *H04W 52/386* (2013.01); *H04W 72/10* (2013.01); *H04W 72/1242* (2013.01)

(56) References Cited

U.S. PATENT DOCUMENTS

2013/0324182 A1   12/2013   Deng et al.
2016/0255593 A1    9/2016   Blankenship et al.
2019/0132096 A1    5/2019   Abedini et al.
2019/0132805 A1    5/2019   Abedini et al.
2019/0132807 A1    5/2019   Abedini et al.

OTHER PUBLICATIONS

International Search Report and Written Opinion—PCT/US2018/054177—ISA/EPO—dated Dec. 4, 2018.

* cited by examiner

TECHNIQUES AND APPARATUSES FOR PRIORITIZATION FOR TRANSMISSION POWER CONTROL IN 5G

CROSS-REFERENCE TO RELATED APPLICATIONS UNDER 35 U.S.C. § 119

This application claims priority to Provisional Patent Application No. 62/579,087, filed on Oct. 30, 2017, entitled "TECHNIQUES AND APPARATUSES FOR PRIORITIZATION FOR TRANSMISSION POWER CONTROL IN 5G," which is hereby expressly incorporated by reference herein.

FIELD OF THE DISCLOSURE

Aspects of the present disclosure generally relate to wireless communication, and more particularly to techniques and apparatuses for prioritization for transmission power control in 5G.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmission power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a control node, may include determining at least one of a transmission power or a reception power for at least one of a first signal or a second signal to be communicated between a target wireless node and at least one other wireless node based at least in part on a priority level of the first signal relative to the second signal, wherein the transmission power or the reception power is based at least in part on at least one of an identity or state of the target wireless node or the at least one other wireless node, or a type of the first signal or the second signal; and configuring the transmission power or the reception power to be used for the first signal or the second signal.

In some aspects, a control node for wireless communication may include memory and one or more processors operatively coupled to the memory. The memory and the one or more processors may be configured to determine at least one of a transmission power or a reception power for at least one of a first signal or a second signal to be communicated between a target wireless node and at least one other wireless node based at least in part on a priority level of the first signal relative to the second signal, wherein the transmission power or the reception power is based at least in part on at least one of an identity or state of the target wireless node or the at least one other wireless node, or a type of the first signal or the second signal; and configure the transmission power or the reception power to be used for the first signal or the second signal.

In some aspects, a non-transitory computer-readable medium may store one or more instructions for wireless communication. The one or more instructions, when executed by one or more processors of a control node, may cause the one or more processors to determine at least one of a transmission power or a reception power for at least one of a first signal or a second signal to be communicated between a target wireless node and at least one other wireless node based at least in part on a priority level of the first signal relative to the second signal, wherein the transmission power or the reception power is based at least in part on at least one of an identity or state of the target wireless node or the at least one other wireless node, or a type of the first signal or the second signal; and configure the transmission power or the reception power to be used for the first signal or the second signal.

In some aspects, an apparatus for wireless communication may include means for determining at least one of a transmission power or a reception power for at least one of a first signal or a second signal to be communicated between a target wireless node and at least one other wireless node based at least in part on a priority level of the first signal relative to the second signal; wherein the transmission power or the reception power is based at least in part on at least one of an identity or state of the target wireless node or the at least one other wireless node, or a type of the first signal or the second signal; and means for configuring the transmission power or the reception power to be used for the first signal or the second signal.

Aspects generally include a method, apparatus, system, computer program product, non-transitory computer-readable medium, user equipment, wireless communication device, wireless node, control node, network controller, central unit, scheduling node, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
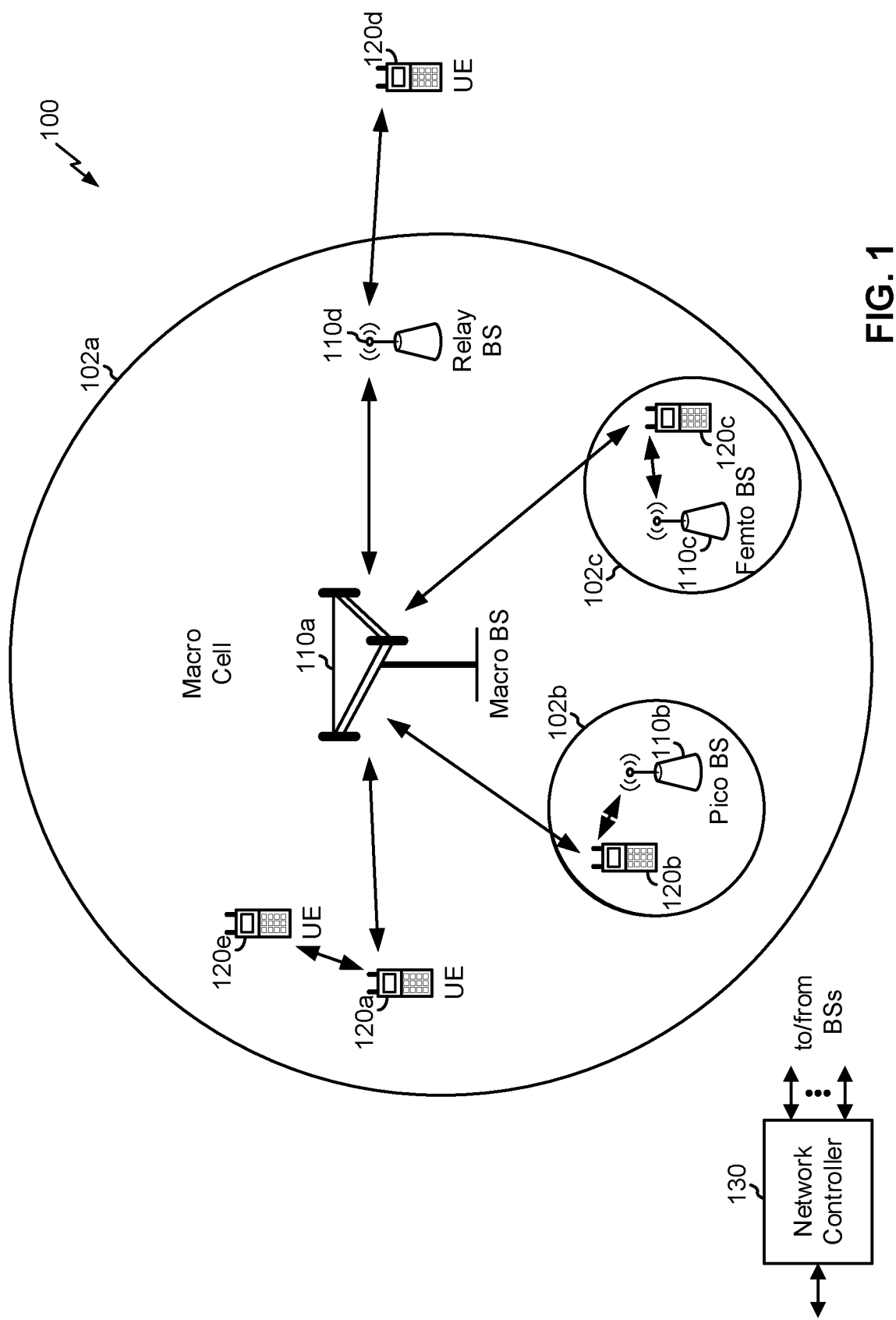
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmission power levels, different coverage areas, and different impact on interference in wireless network 100. For example, macro BSs may have a high transmission power level (e.g., 5 to 40 Watts) whereas pico BSs, femto BSs, and relay BSs may have lower transmission power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a BS 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the BS 110.

As indicated above, FIG. 1 is provided merely as an example. Other examples are possible and may differ from what was described with regard to FIG. 1.

Figure 2:
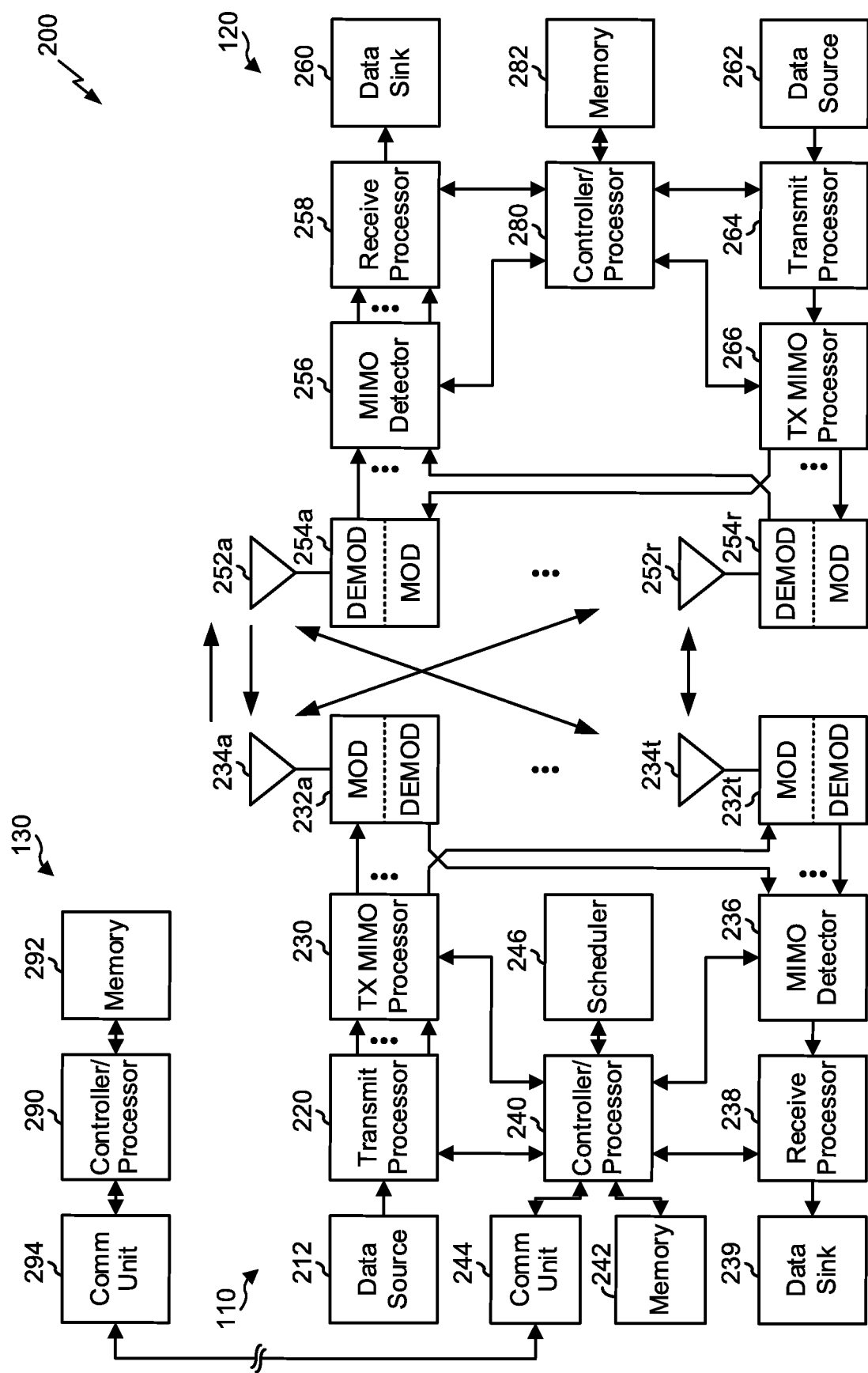
FIG. 2 is a block diagram conceptually illustrating an example of a base station in communication with a user equipment (UE) in a wireless communication network, in accordance with various aspects of the present disclosure.

FIG. 2 shows a block diagram of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of BS 110, controller/processor 280 of UE 120, and/or any other component(s) of FIG. 2 may perform one or more techniques associated with prioritization for transmission power control in 5G, as described in more detail elsewhere herein. For example, controller/processor 240 of BS 110, controller/processor 280 of UE 120, and/or any other component(s) of FIG. 2 may perform or direct operations of, for example, process 900 of FIG. 9 and/or other processes as described herein. Memories 242 and 282 may store data and program codes for BS 110 and UE 120, respectively. A scheduler 246 may schedule UEs for data transmission on the downlink and/or uplink.

In some aspects, a control node (e.g., BS 110 or UE 120) may include means for determining at least one of a transmission power or a reception power for at least one of a first signal or a second signal to be communicated between a target wireless node and at least one other wireless node based at least in part on a priority level of the first signal relative to the second signal; means for configuring the transmission power or the reception power to be used for the first signal or the second signal; means for providing information for identifying the priority level; means for determining a transmission configuration for the first signal or the second signal; means for adjusting a receiver configuration; means for providing control information that indicates the priority level; means for receiving control information; means for determining the priority level based at least in part on the control information; and/or the like. In some aspects, such means may include one or more components of BS 110 and/or UE 120 described in connection with FIG. 2.

As indicated above, FIG. 2 is provided merely as an example. Other examples are possible and may differ from what was described with regard to FIG. 2.

Figure 3A:
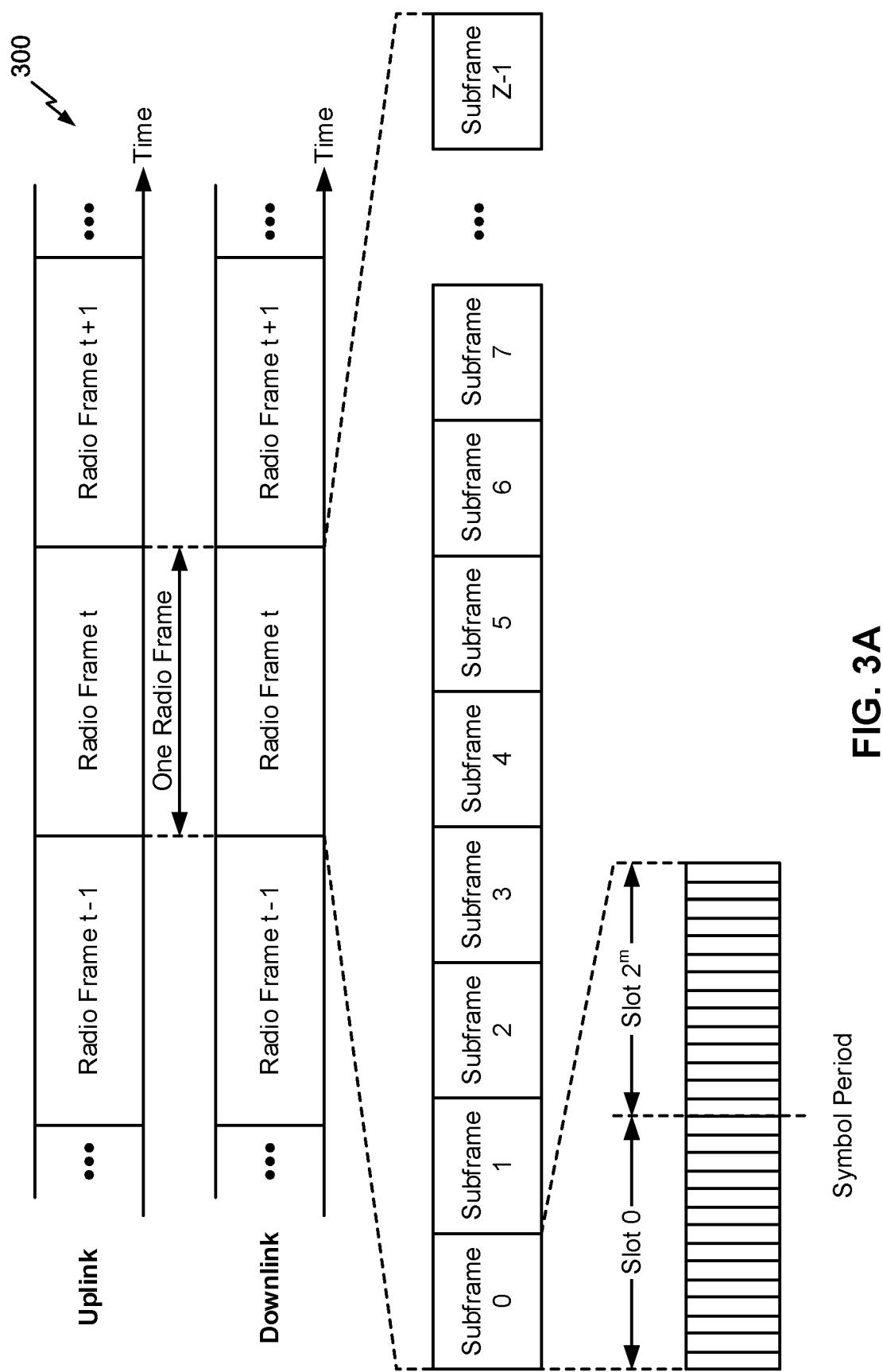
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2 L symbol periods, where the 2 L symbol periods in each subframe may be assigned indices of 0 through 2 L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
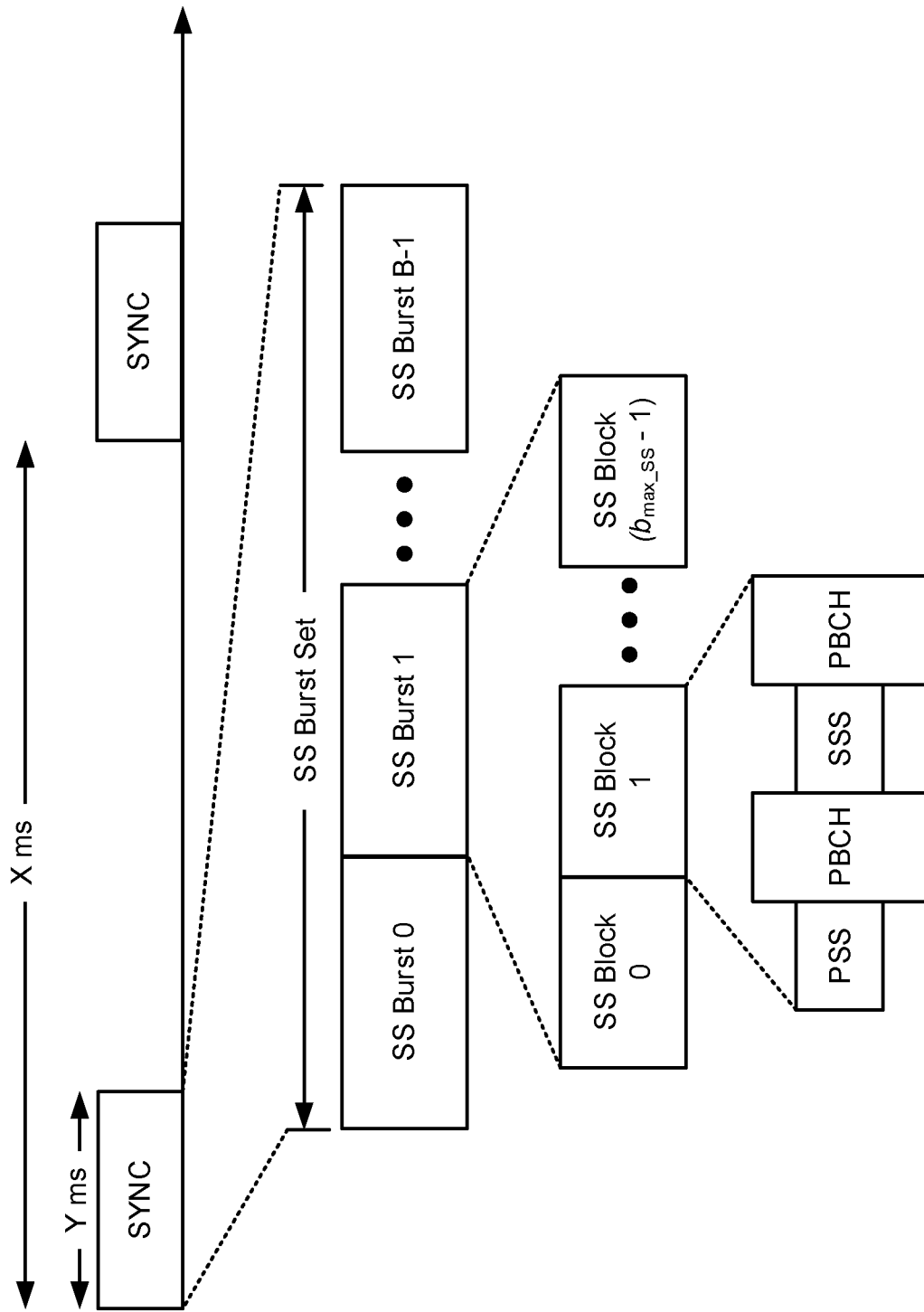
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
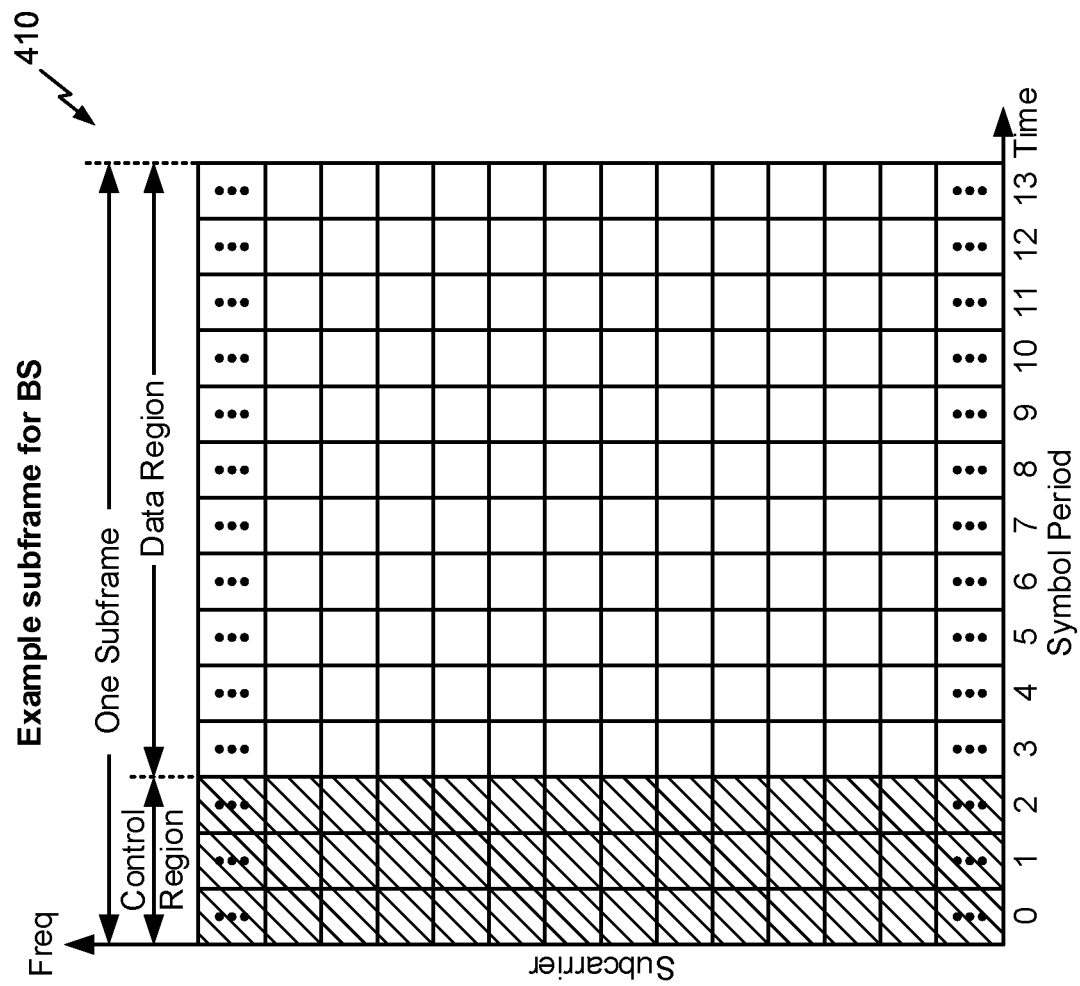
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q ∈ {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
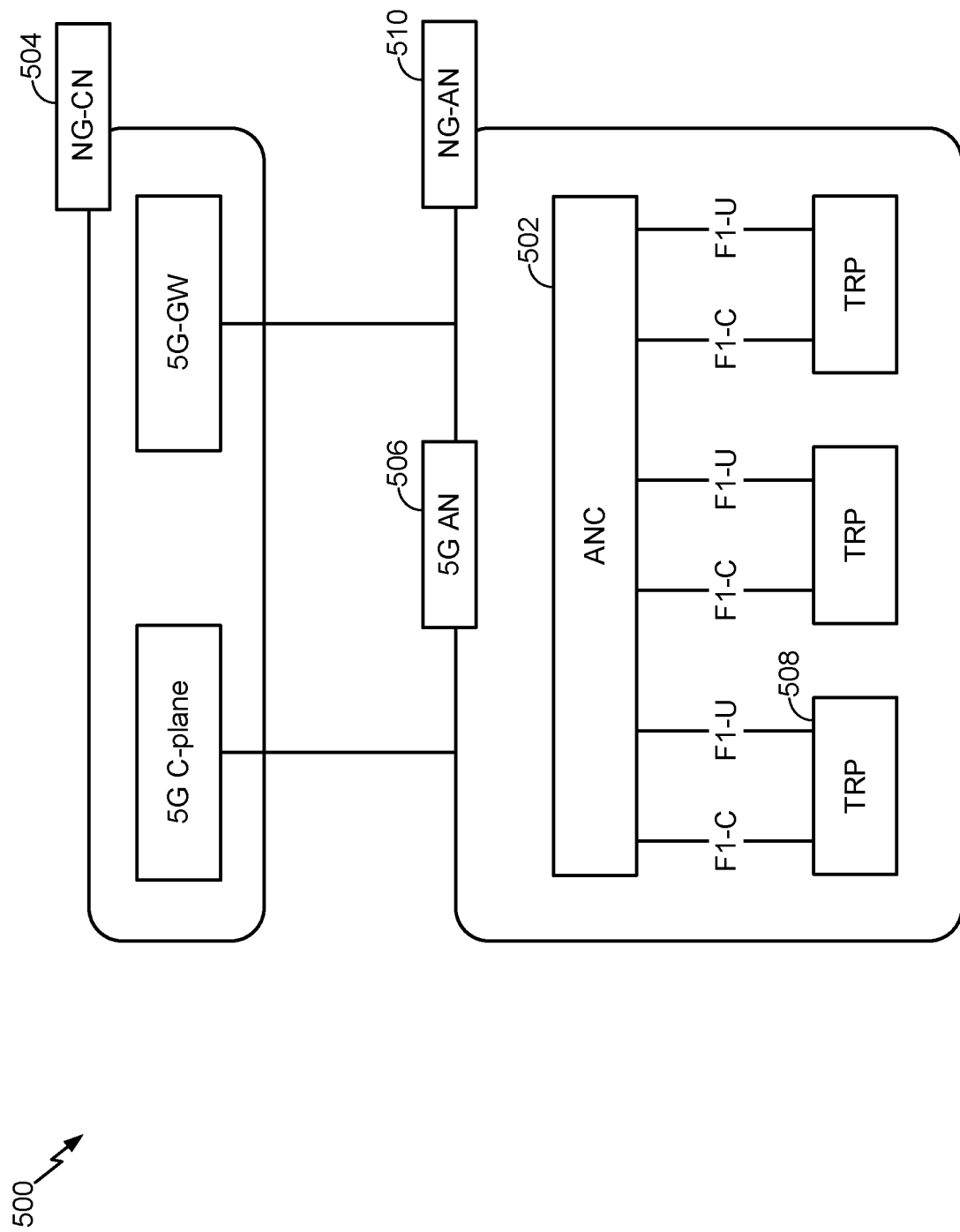
FIG. 5 illustrates an example logical architecture of a distributed radio access network (RAN), in accordance with certain aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to certain aspects, a BS may include a central unit (CU) (e.g., ANC 502) and/or one or more distributed units (e.g., one or more TRPs 508 or one or more AN functions (ANFs)).

As indicated above, FIG. 5 is provided merely as an example. Other examples are possible and may differ from what was described with regard to FIG. 5.

Figure 6:
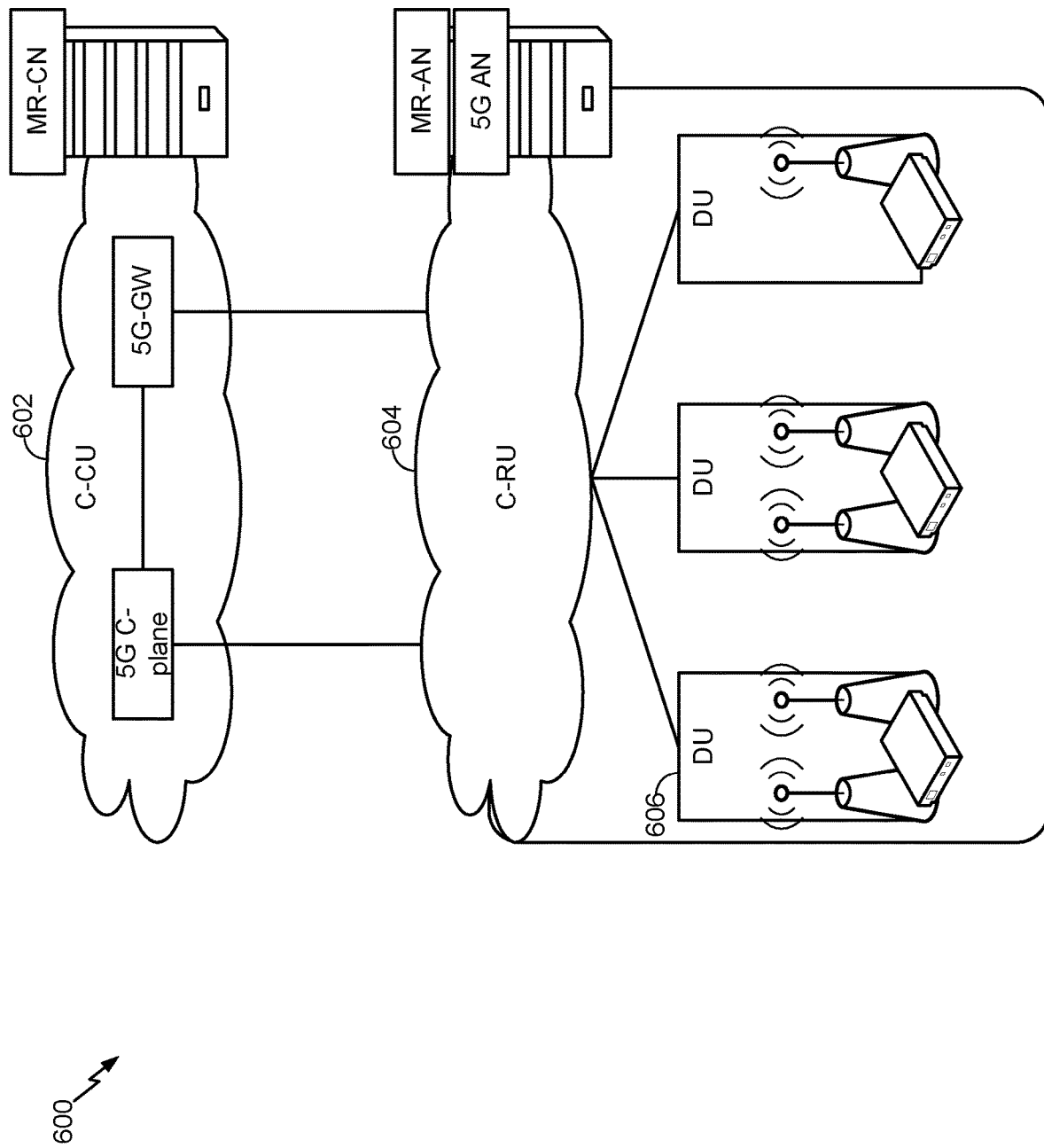
FIG. 6 illustrates an example physical architecture of a distributed RAN, in accordance with certain aspects of the present disclosure.

FIG. 6 illustrates an example physical architecture of a distributed RAN 600, according to aspects of the present disclosure. A centralized core network unit (C-CU) 602 may host core network (CN) functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

Figure 7A:
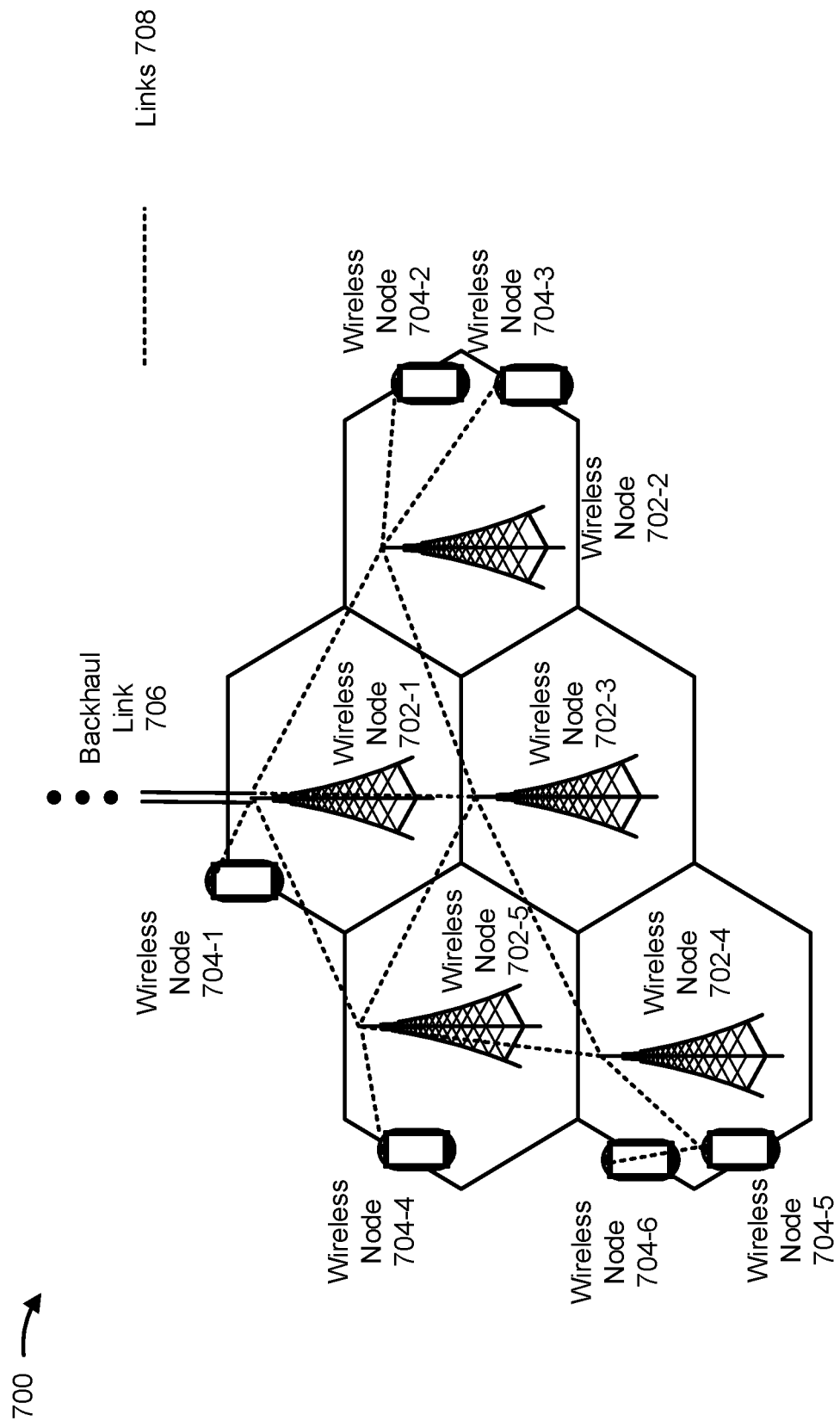
FIGS. 7A and 7B are diagrams illustrating an example of a network topology for a network, in accordance with various aspects of the present disclosure.
Figure 7B:
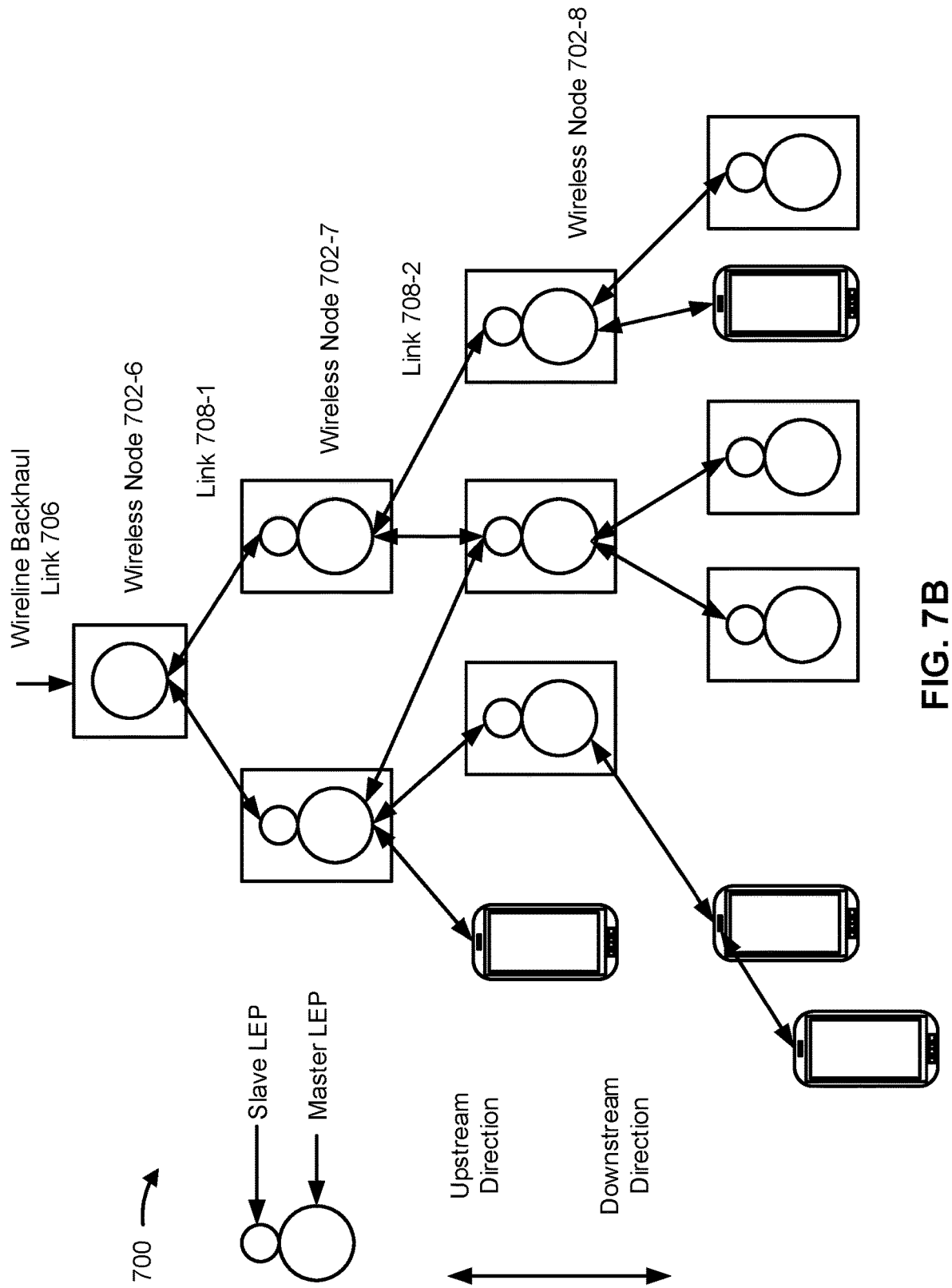

FIGS. 7A and 7B are diagrams illustrating an example 700 of a network topology for a network, in accordance with various aspects of the present disclosure. Self-backhauling or integrated access/backhaul (IAB) may be deployed to use a common set of resources for access traffic and backhaul traffic. For example, a first wireless node (e.g., a BS 110, a UE 120, and/or the like) may communicate backhaul traffic via first mmWave resources with a second wireless node, and may communicate access traffic via second mmWave resources with a third wireless node.

As shown in FIG. 7A, example 700 may include multiple wireless nodes 702 (e.g., BSs) and multiple wireless nodes 704 (e.g., UEs). At least one wireless node (e.g., wireless node 702-1) may communicate with a core network via a backhaul link 706, such as a fiber connection, a wireless backhaul connection, and/or the like. Wireless nodes 702 and 704 may communicate with each other using a set of links 708, such as a set of mmWave links; a 3G, 4G, 5G, etc. air interface; and/or the like. In some aspects, a wireless node 702 may correspond to BS 110 or UE 120 shown in FIG. 1. Similarly, a wireless node 704 may correspond to BS 110 or a UE 120 shown in FIG. 1.

As further shown in FIG. 7A, one or more wireless nodes 702 or 704 may communicate indirectly via one or more other wireless nodes 702 or 704. For example, data may be transferred from a core network to wireless node 704-6 via backhaul link 706, a link 708 between wireless node 702-1 and wireless node 702-5, a link 708 between wireless node 702-5 and wireless node 702-4, a link 708 between wireless node 702-4 and wireless node 704-5, and a link 708 between wireless node 704-5 and wireless node 704-6. In some aspects, multiple different paths may be used to communicate data between wireless nodes 702 or 704. For example, wireless node 702-5 may communicate with wireless node 702-4 via a single link 708 between wireless node 702-5 and wireless node 702-4 (e.g., a direct link) and/or via a first link 708 between wireless node 702-5 and wireless node 702-3 and a second link between wireless node 702-3 and wireless node 702-4 (e.g., an indirect link).

As shown in FIG. 7B, wireless nodes 702 and wireless nodes 704 can be arranged in a hierarchical topology to enable management of network resources. Each link 708 may be associated with a master link end point (master LEP) and a slave link end point (slave LEP), which may define a hierarchy between wireless nodes 702 or 704. For example, wireless node 702-6 may communicate with wireless node 702-7 via link 708-1. In this case, wireless node 702-6 is associated with a master link end point and wireless node 702-7 is associated with a slave link end point for link 708-1, which may define wireless node 702-6 as hierarchically superior to wireless node 702-7, and wireless node 702-7 as hierarchically inferior to wireless node 702-6 with regard to link 708-1. Moreover, wireless node 702-6 may be defined as upstream relative to wireless node 702-7 (and wireless node 702-7 may be defined as downstream relative to wireless node 702-6).

Similarly, wireless node 702-7 includes a master link end point for link 708-2 and wireless node 702-8 includes a slave link end point for backhaul link 708-2. In this case, wireless node 702-7 is hierarchically superior and upstream to wireless node 702-8, and wireless node 702-8 is hierarchically inferior and downstream to wireless node 702-7 with regard to link 708-2. In some aspects, a wireless node 702 or 704 may include a single antenna or antenna array for both the slave link end point and master link end point. In some aspects, a wireless node 702 or 704 may include a first antenna or antenna array for the slave link end point and a second antenna or antenna array for the master link end point.

In some aspects, wireless node 702-6, or a central unit, may be referred to herein as an IAB-donor. The IAB-donor may be the RAN node that provides the UE's interface to the core network and that provides wireless backhauling functionality to IAB nodes. Wireless nodes 702-7, 702-8, and so on may be referred to as IAB nodes. An IAB node may be associated with a mobile terminal (MT), which may act as a UE for the parent IAB node of the IAB node or for the IAB-donor. An IAB node may also be associated with a DU or gNB, which may function as a base station (e.g., a gNB, a gNB-DU with a MAC scheduler, etc.) for child nodes of the IAB node.

As indicated above, FIGS. 7A and 7B are provided as examples. Other examples are possible and may differ from what was described with respect to FIGS. 7A and 7B.

An upstream wireless node may determine one or more transmission powers for communications to a downstream wireless node. Furthermore, the downstream wireless node may determine one or more uplink transmission powers for uplink communications to the upstream wireless node. Still further, a wireless node may determine a reception power for a received signal. In some aspects, wireless nodes may determine powers (e.g., transmit or reception powers) for simultaneous communications (e.g., two or more signals directed to or received from one or more wireless nodes). In some aspects, it may be difficult to determine powers (e.g., transmit and/or reception powers) for simultaneous communications between a target wireless node and one or more other wireless nodes. As a particular example, one wireless node, type of traffic, beam direction, or transmission timing may be more important than another wireless node, type of traffic, beam direction, or transmission timing. Therefore, it may be difficult to properly configure powers for multiple wireless nodes, which may lead to desensitization, overpowering of transmissions, interference, power waste, and/or the like.

Some aspects, described herein, provide for determination of a transmission power or a reception power for a first signal and a second signal to be communicated between a target wireless node and at least one other wireless node based at least in part on a priority level of the first signal relative to the second signal. For example, the priority level may be based at least in part on identity or state of a wireless node, a type of signal of the first signal or the second signal, a direction or timing associated with the first signal or the second signal, and/or the like. Furthermore, some aspects described herein may provide semi-static control for some transmissions (e.g., downlink reference signals for radio resource management, periodic channel state information reference signals, and other transmissions that require semi-statically allocated transmit power) and dynamic control for other transmissions. This may enable the semi-static control of access and backhaul links that share common time resources for such transmissions. In this way, determination of transmission power or reception power for the target wireless node and the at least one other wireless node is improved, which improves efficiency, reduces interference, and conserves power of the target wireless node and the at least one other wireless node.

Figure 8:
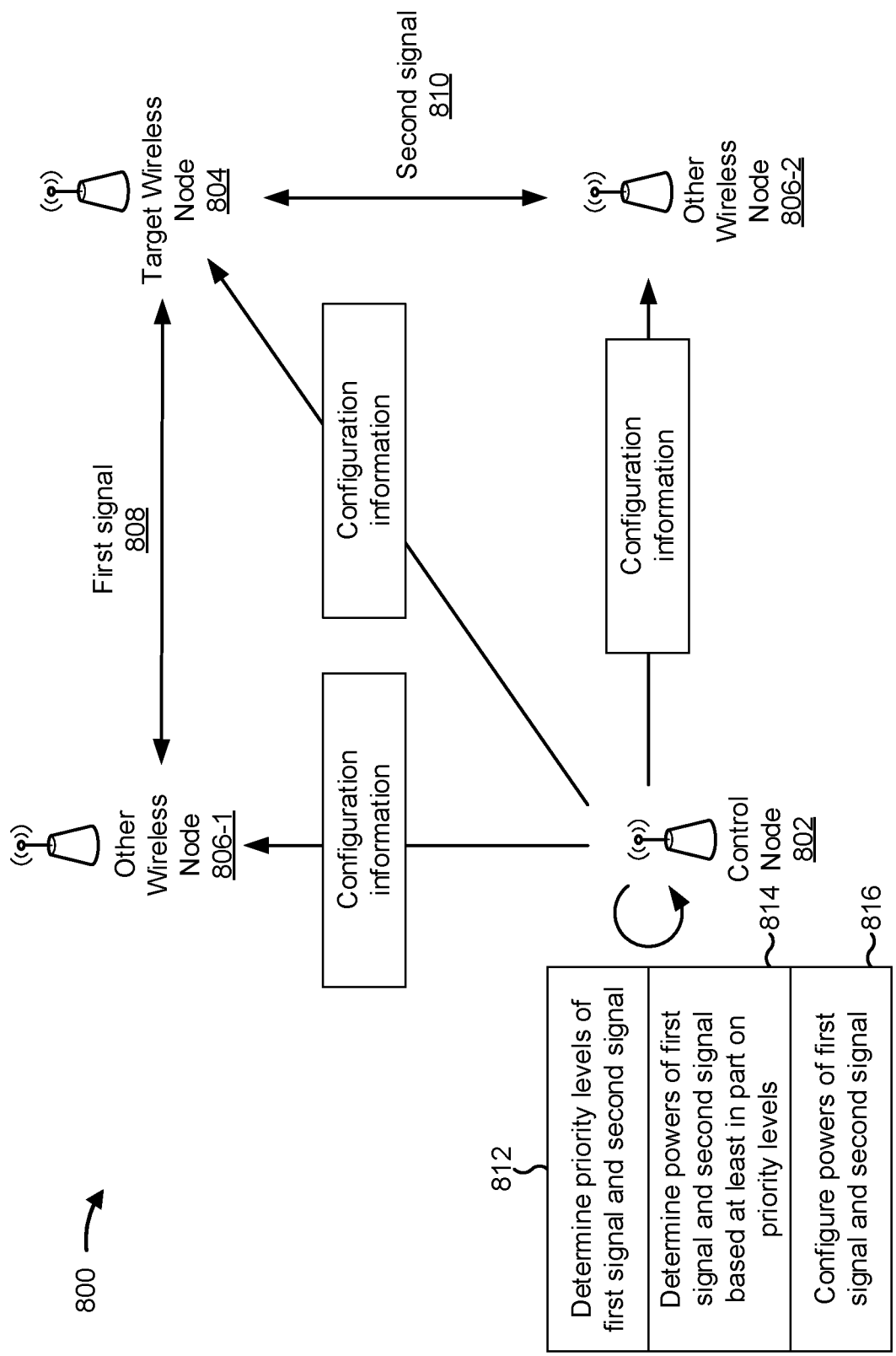
FIG. 8 is a diagram illustrating an example of prioritization for transmission power control in 5G, in accordance with various aspects of the present disclosure.

FIG. 8 is a diagram illustrating an example 800 of prioritization for transmission power control in 5G, in accordance with various aspects of the present disclosure. As shown, example 800 includes a control node 802, a target wireless node 804, and two other wireless nodes 806 (shown as other wireless node 806-1 and other wireless node 806-2). Control node 802, target wireless node 804, and other wireless nodes 806 may include, for example, BS 110, UE 120, wireless node 702, wireless node 704, and/or the like. In some aspects, control node 802 may be any one of the target wireless node 804, the other wireless node 806-1 or 806-2, a node other than the wireless nodes 804 and 806, a 5G network controller, a central unit (e.g., an IAB-donor), an upper layer of the network, a scheduling node or scheduler of the nodes 804 and/or 806, and/or the like. As described herein, a target wireless node may be a wireless node that is to concurrently perform communications using two or more signals with two or more other wireless nodes. Furthermore, while the operations described herein are primarily described in the context of two signals and two wireless nodes, the operations described herein may be performed with regard to any number of signals between a target wireless node and one or more other wireless nodes.

As further shown, example 800 may include a first signal 808 between the target wireless node 804 and the other wireless node 806-1. For example, the first signal 808 may be on a wireless link between the target wireless node 804 and the other wireless node 806-1. In some aspects, the target wireless node 804 may be upstream from the other wireless node 806-1. In some aspects, the other wireless node 806-1 may be upstream from the target wireless node 804.

As further shown, example 800 may include a second signal 810 between the target wireless node 804 and the other wireless node 806-2. For example, the second signal 810 may be on a wireless link between the target wireless node 804 and the other wireless node 806-2. In some aspects, the target wireless node 804 may be upstream from the other wireless node 806-2. In some aspects, the other wireless node 806-2 may be upstream from the target wireless node 804. In some aspects, the first signal 808 and the second signal 810 may be between the target wireless node 804 and a single other wireless node 806.

As shown by reference number 812, the control node 802 may determine priority levels of the first signal 808 and the second signal 810. Additionally, or alternatively, the control node 802 may determine a priority level of the first signal 808 relative to the second signal 810. The control node 802 may determine the priority level or levels so that the control node 802 can more efficiently determine and configure powers for the first signal 808 and the second signal 810.

In some aspects, the control node 802 may determine the priority level based at least in part on a signal type of the signals 808/810. For example, the control node 802 may determine the priority level based at least in part on a signal being a control signal, a data signal, a reference signal, and/or the like. Additionally, or alternatively, the control node 802 may determine the priority level based at least in part on a signal being a high-priority signal, a low-latency transmission, and/or the like. Additionally, or alternatively, the control node 802 may determine the priority level based at least in part on whether the signal is to be semi-statically power configured or dynamically power configured.

In some aspects, the control node 802 may determine the priority level based at least in part on an identity or state of the target wireless node 804. For example, the control node 802 may determine the priority level based at least in part on whether the target wireless node 804 (or the other wireless node 806) is a scheduling node or scheduler with regard to the other wireless node 806 (or the target wireless node 804). When the target wireless node 804 is a scheduling node or scheduler of the other wireless node 806, the control node 802 may assign a higher priority than when the target wireless node 804 is not a scheduling node or scheduler of the other wireless node 806. Additionally, or alternatively, the control node 802 may determine the priority level based at least in part on whether the target wireless node 804 or the other wireless node 806 is an access node function (ANF) (e.g., a DU) or a UE function (UEF) (e.g., a MT).

Additionally, or alternatively, the control node 802 may determine the priority level based at least in part on a priority level associated with a wireless node. For example, a priority level associated with a wireless node may be indicated in a synchronization signal, a master information block, a system information block, a radio resource control message, downlink control information, and/or the like. In such a case, the priority level associated with the wireless node may be based at least in part on a hop count of the wireless node, a resource partitioning configuration of the control node 802, a capability of the control node 802 or the wireless node, a mobility state of the wireless node (e.g., fixed, low mobility, high mobility, etc.), a topological state (e.g., hop count, number of children, number of parents, etc.), and/or the like. For example, time resources of a link or signal may be partitioned into two or more sets. The control node 802 may determine the priority level for a communication or wireless node based at least in part on a set of resources associated with the communication or wireless node.

In some aspects, the control node 802 may determine the priority level based at least in part on transmission timing of the signals 808 and/or 810. Additionally, or alternatively, the control node 802 may determine the priority level based at least in part on a direction (e.g., an angular direction) toward which the first signal 808 and/or the second signal 810 are being transmitted or received. For example, the control node 802 may prioritize a signal that started at an earliest time and/or that is directed in a particular direction.

In some aspects, the priority level may be determined by a network or a central unit of the network. In such a case, the control node may be the central unit, or may receive information identifying the priority level from the network or the central unit. In some aspects, the priority level may be determined by target wireless node 804 (e.g., when the control node 802 is the target wireless node 804). In some aspects, the priority level may be determined by other wireless node 806 (e.g., when the control node is the other wireless node 806) or a node other than the other wireless node 806. In some aspects, the priority level may be determined by a primary scheduler or scheduling node or scheduler of the control node 802 or the target wireless node 804. In some aspects, the priority level may be determined by a group of nodes that includes one or more of control node 802, target wireless node 804, or other wireless node 806.

In some aspects, the control node 802 may determine the priority level based at least in part on a predetermined configuration for determining the priority level. Additionally, or alternatively, the control node 802 may determine the priority level based at least in part on received information indicating that a default priority level, rule for determining the priority level, or predetermined configuration, is overridden. For example, the received information may be received from a network controller, an ANF, an upper layer of the network, another wireless node, a central unit, and/or the like. In this way, the control node 802 may determine the priority level on a dynamic or temporary basis when a default priority level is overridden. Additionally, or alternatively, the control node 802 may determine the priority level based at least in part on received signaling. For example, the control node 802 may receive the received signaling from any one or more of an upper layer of a network, one or more other wireless nodes (e.g., target wireless node 804, other wireless node 806, and/or another wireless node), a central unit (e.g., an IAB-donor) or 5G network controller, and/or the like.

In some aspects, the control node 802 may determine the priority level based at least in part on scheduling of the first signal 808 and/or the second signal 810. For example, the control node 802 may determine the priority level based at least in part on whether the scheduling is a dynamic scheduling grant or a semi-persistent scheduling grant. Additionally, or alternatively, a grant associated with a signal may identify the priority level. For example, the priority level of the signal may be indicated in downlink control information (DCI) and/or the like.

In some aspects, the control node 802 may determine the priority level based at least in part on a combination of two or more of the above approaches. For example, the control node 802 may determine the priority level based at least in part on an identity or state of the target wireless node 804 and a signal type of the first signal 808 or the second signal 810. As a more particular example, the control node 802 may determine the priority level based at least in part on a combination of ANF identifier and channel type. For example, an acknowledgment signal to a primary ANF may be associated with a highest priority level, a DCI to a UEF may be associated with an intermediate priority level, and a data signal to a primary ANF may be associated with a lowest priority level.

In some aspects, the control node 802 may transmit or receive one or more signals based at least in part on the priority level. For example, the control node 802 may transmit or receive information for identifying the priority level. In some aspects, the information for identifying the priority level and/or the received information may include one or more of a value of a parameter relating to the priority level, a suggested value of the parameter relating to the priority level, a requested value of the parameter relating to the priority level, information indicating whether a value of a parameter, received from another wireless node and relating to the priority level, is accepted or rejected, a measurement, capability information, information identifying a limitation of the control node or the target wireless node, or scheduling information for determining the priority level. In some aspects, the received signaling and/or the information for identifying the priority level may be provided in at least one of downlink control information, uplink control information, a media access control control element, radio resource signaling, a master information block, a system information block, or one or more reference signals. In some aspects, when the control node 802 determines the priority level, the control node 802 may provide control information that indicates or identifies the priority level. In some aspects, when the control node 802 receives control information, the control node 802 may determine the priority level based at least in part on the control information (e.g., the control information may identify the priority level).

As shown by reference number 814, the control node 802 may determine powers for the first signal 808 and the second signal 810 based at least in part on the priority levels. As used herein, a power may refer to a transmission power and/or a reception power. A transmission power may be a power level at which a signal is to be transmitted (e.g., by an upstream wireless node). A reception power may refer to a receiver configuration for receiving a signal. For example, the receiver configuration may relate to at least one of a receiver power configuration, a low noise amplifier gain configuration, a receiver filter configuration, an analog beamforming configuration, or a digital beamforming configuration.

In some aspects, the control node 802 may determine a power or priority level based at least in part on a minimum transmission power and/or a maximum transmission power. For example, a wireless node or signal may be associated with a minimum guaranteed transmission power. The minimum guaranteed transmission power may identify a transmission power that must be provided for the wireless node or signal to ensure successful operation of the wireless node or signal. The control node 802 may receive information identifying one or more minimum guaranteed transmission powers for a signal, and may determine a priority level for the signal and/or a wireless node that transmits the signal so that the minimum guaranteed transmission power is satisfied.

In some aspects, the control node 802 may determine and/or configure a transmission configuration for a signal. For example, the transmission configuration may relate to at least one of a modulation and coding scheme (MCS) for the signal, a transmission timing alignment of the signal and another signal, a bandwidth associated with the signal, a reference signal resource for the signal, a reference signal configuration for the signal, a beamforming configuration for the signal, a precoding configuration for the signal, and/or the like.

As shown by reference number 816, the control node 802 may configure the powers (e.g., reception powers and/or transmission powers) of the first signal 808 and the second signal 810. For example, the control node 802 may provide configuration information so that the powers, determined in connection with reference number 814, are implemented by the other wireless nodes 806 and/or the target wireless node 804. Additionally, or alternatively, the control node 802 may cause the powers to be implemented by the other wireless nodes 806 and/or the target wireless node 804. For example, the control node 802 may cause transmission using the plurality of powers and other wireless nodes 806-1/806-2 may transmit or receive the signals 808/810 using the plurality of powers. For example, target wireless node 804 may receive information from other wireless node 806-1 via signal 808 using a first power, and may, concurrently, receive information from other wireless node 806-2 via signal 810 using a second power.

As an example of the above, the control node 802 may configure a first transmission power and/or reception power semi-statically, and may configure a second transmission power and/or reception power dynamically. For example, control node 802 may configure the first transmission power and/or reception power semi-statically for a signal that is associated with a semi-static transmission power, and may configure the second transmission power and/or reception power dynamically for another type of signal. In this way, configuration of transmission powers and/or reception configurations is provided in mixed semi-static and dynamic situations, thereby reducing interference and improving reliability of the semi-statically configured signals.

In some aspects, control node 802 may provide signaling (e.g., identifying a power, a receiver configuration relating to a power, and/or the like), such as the configuration information shown in FIG. 8, to a wireless node to cause transmission, such as to target wireless node 804, other wireless node 806, and/or the like. In this way, control node 802 enables target wireless node to transmit and/or receive a plurality of concurrent communications by determining powers for the plurality of concurrent communications according to priority levels of the plurality of concurrent communications. Moreover, control node 802 enables target wireless node 804 to transmit a plurality of concurrent transmissions without excessive inter-link interference, without exceeding a maximum transmit power criterion, and/or the like by determining powers for the plurality of concurrent transmissions according to respective priority levels of the plurality of concurrent transmissions.

As indicated above, FIG. 8 is provided as an example. Other examples are possible and may differ from what was described with respect to FIG. 8.

Figure 9:
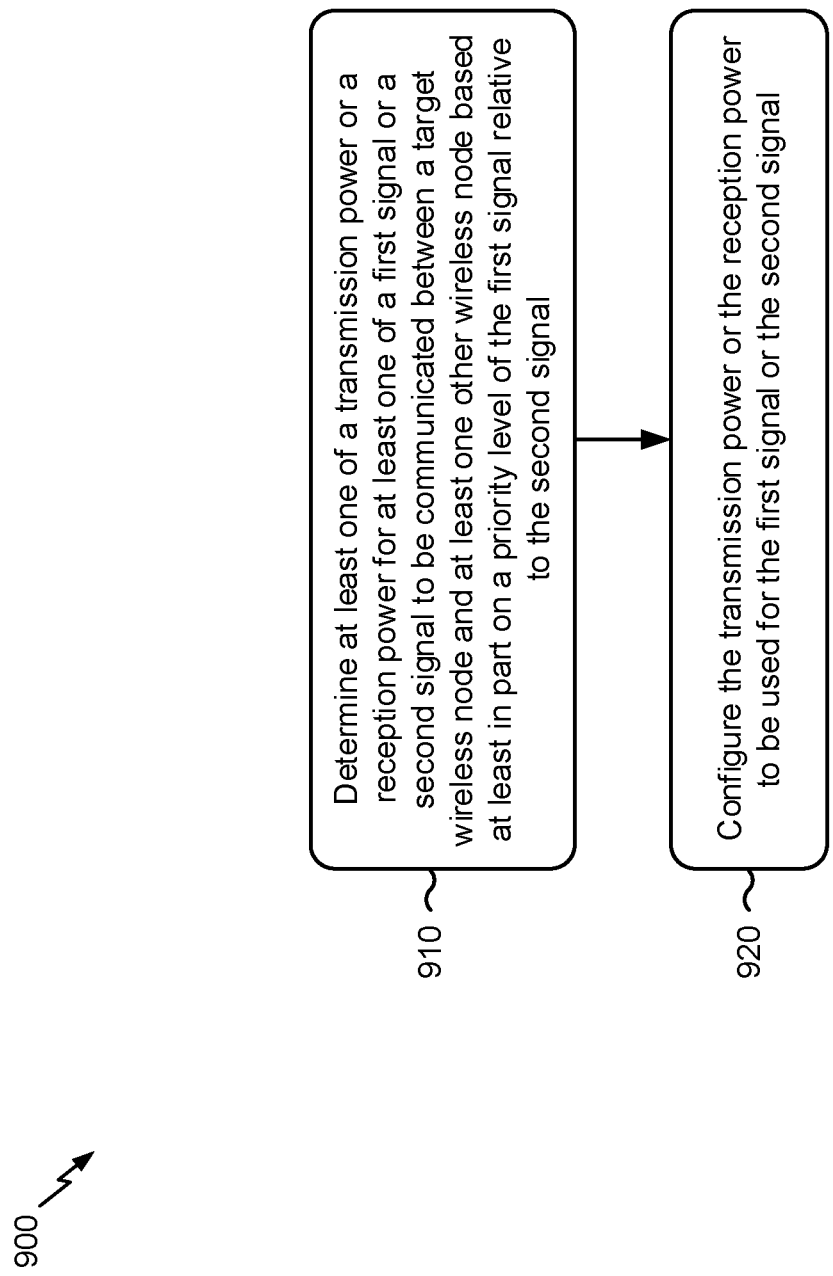
FIG. 9 is a diagram illustrating an example process performed, for example, by a control node, in accordance with various aspects of the present disclosure.

FIG. 9 is a diagram illustrating an example process 900 performed, for example, by a control node, in accordance with various aspects of the present disclosure. Example process 900 is an example where a control node (e.g., BS 110, UE 120, wireless node 702, wireless node 704, control node 802, target wireless node 804, other wireless node 806, etc.) performs prioritization for transmission power control in 5G.

As shown in FIG. 9, in some aspects, process 900 may include determining at least one of a transmission power or a reception power for at least one of a first signal or a second signal to be communicated between a target wireless node and at least one other wireless node based at least in part on a priority level of the first signal relative to the second signal (block 910). For example, the control node (e.g., using controller/processor 240, controller/processor 280, and/or the like) may identify or determine a priority level of a first signal relative to a second signal. Additionally, or alternatively, the control node may identify a first priority level of a first signal and a second priority level of a second signal. The control node may use the priority level to determine at least one of a transmission power or a reception power for the first signal and/or the second signal, wherein the first signal and the second signal are to be communicated between a target wireless node and at least one other wireless node. The transmission power or the reception power may be based at least in part on at least one of an identity or state of the at least one other wireless node or a type of the first signal or the second signal.

As shown in FIG. 9, in some aspects, process 900 may include configuring the transmission power or the reception power to be used for the first signal or the second signal (block 920). For example, the control node (e.g., using controller/processor 240, controller/processor 280, and/or the like) may configure the transmission power or the reception power to be used for the first signal or the second signal. In some aspects, the control node may cause the transmission power or the reception power to be used. In some aspects, the control node may use the transmission power or the reception power for the first signal or the second signal (e.g., when the control node is the target wireless node or the one or more other wireless nodes).

Process 900 may include additional aspects, such as any single aspect or any combination of aspects described below and/or in connection with one or more other processes described elsewhere herein.

In some aspects, the UE may determine a transmission configuration for the first signal or the second signal, wherein the transmission configuration relates to at least one of: a modulation and coding scheme of the first signal or the second signal, a transmission timing alignment of the first signal or the second signal, a bandwidth associated with the first signal or the second signal, a reference signal resource for the first signal or the second signal, a reference signal configuration for the first signal or the second signal, a beamforming configuration for the first signal or the second signal, or a precoding configuration for the first signal or the second signal.

In some aspects, the UE may adjust (e.g., determine, configure, etc.) a receiver configuration, wherein the receiver configuration relates to at least one of a receiver power configuration, a low noise amplifier gain configuration, a receiver filter configuration, an analog beamforming configuration, or a digital beamforming configuration. In some aspects, the priority level is based at least in part on a transmission timing of at least one of the first signal or the second signal. In some aspects, the priority level is based at least in part on a transmission direction or reception direction of at least one of the first signal or the second signal.

In some aspects, the priority level is determined by a central unit, a 5G network controller, or a wireless node other than the control node. In some aspects, the priority level is determined by the control node. In some aspects, the priority level is determined by a scheduler of the control node. In some aspects, the priority level is determined by a group of wireless nodes including at least one of the control node, the target wireless node, or the at least one other wireless node. In some aspects, the priority level is determined based at least in part on a preconfigured setting.

In some aspects, the priority level is based at least in part on received signaling. The control node may receive the received signaling from at least one of an upper layer of a network, another wireless node, or a central unit or a 5G network controller. In some aspects, the control node may provide information for identifying the priority level to at least one of an upper layer of a network, another wireless node, or a central unit or a 5G network controller. In some aspects, the information for identifying the priority level identifies at least one of a value of a parameter relating to the priority level, a suggested value of the parameter relating to the priority level, a requested value of the parameter relating to the priority level, information indicating whether a value of a parameter, received from another wireless node and relating to the priority level, is accepted or rejected, a measurement, capability information, information identifying a limitation of the control node or the target wireless node, or scheduling information for determining the priority level.

In some aspects, the received signaling or the information for identifying the priority level is provided in at least one of downlink control information, uplink control information, a media access control control element, radio resource signaling, a master information block, a system information block, an upper layer signal, an F1-AP message, or one or more reference signals.

In some aspects, the priority level is determined based at least in part on the first signal or the second signal being a high-priority or low-latency transmission. In some aspects, the priority level is determined based at least in part on received information indicating that a default priority level or rule for determining the priority level is overridden.

In some aspects, the priority level is determined based at least in part on a scheduling message, configuration information, or downlink control information for at least one of the first signal or the second signal. In some aspects, the priority level is determined based at least in part on a scheduling method associated with at least one of the first signal or the second signal. In some aspects, the priority level is determined based at least in part on information specifying a priority level of the control node or the target wireless node, wherein the priority level of the control node or the target wireless node is based at least in part on a hop count associated with the control node or a resource partitioning configuration of the control node.

In some aspects, the control node may provide control information that indicates the priority level. In some aspects, the control node may receive control information; and determine the priority level based at least in part on the control information.

In some aspects, the priority level is determined based at least in part on information specifying a priority level of the control node or the target wireless node. In some aspects, the priority level of the control node or the target wireless node is based at least in part on at least one of a hop count associated with the control node, a resource partitioning configuration of the control node, a capability of the control node or the target wireless node, a mobility state of the control node or the target wireless node, or a topological state of the control node or the target wireless node. In some aspects, the control node is one of the target wireless node, another wireless node of the at least one other wireless node, a central unit, a scheduler node of a network, or a group of wireless nodes. In some aspects, the priority level is determined based at least in part on a resource associated with the first signal or the second signal.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a control node, comprising:
   determining at least one of a transmission power or a reception power for at least one of a first signal or a second signal to be communicated between a target wireless node and at least one other wireless node based at least in part on a priority level of the first signal relative to the second signal,
      wherein the transmission power or the reception power is based at least in part on at least one of an identity or state of the target wireless node or the at least one other wireless node, or a type of the first signal or the second signal;
   configuring the transmission power or the reception power to be used for the first signal or the second signal; and
   determining a transmission configuration for the first signal or the second signal, wherein the transmission configuration relates to at least one of:
      a modulation and coding scheme of the first signal or the second signal,
      a transmission timing alignment of the first signal or the second signal,
      a bandwidth associated with the first signal or the second signal,
      a reference signal resource for the first signal or the second signal,
      a reference signal configuration for the first signal or the second signal,
      a beamforming configuration for the first signal or the second signal, or
      a precoding configuration for the first signal or the second signal.

2. The method of claim 1, wherein the priority level is determined based at least in part on a scheduling message, configuration information, or downlink control information for at least one of the first signal or the second signal.

3. The method of claim 1, further comprising:
   adjusting a receiver configuration, wherein the receiver configuration relates to at least one of:
      a receiver power configuration,
      a low noise amplifier gain configuration,
      a receiver filter configuration,
      an analog beamforming configuration, or
      a digital beamforming configuration.

4. The method of claim 1, wherein the priority level is based at least in part on a transmission timing of at least one of the first signal or the second signal.

5. The method of claim 1, wherein the priority level is based at least in part on a transmission direction or reception direction of at least one of the first signal or the second signal.

6. The method of claim 1, wherein the priority level is determined by a central unit, a 5G network controller, or a wireless node other than the control node.

7. The method of claim 1, wherein the priority level is determined by the control node.

8. The method of claim 1, wherein the priority level is determined by a scheduler of the control node.

9. The method of claim 1, wherein the priority level is determined by a group of wireless nodes including at least one of the control node, the target wireless node, or the at least one other wireless node.

10. The method of claim 1, wherein the priority level is determined based at least in part on a preconfigured setting.

11. The method of claim 1, wherein the priority level is based at least in part on received signaling; and
wherein the method further comprises receiving the received signaling from at least one of:
an upper layer of a network,
another wireless node, or
a central unit or a 5G network controller.

12. The method of claim 1, further comprising:
receiving information for identifying the priority level to at least one of:
an upper layer of a network,
the at least one other wireless node, or
a central unit or a 5G network controller.

13. The method of claim 12, wherein the information for identifying the priority level identifies at least one of:
a value of a parameter relating to the priority level,
a suggested value of the parameter relating to the priority level,
a requested value of the parameter relating to the priority level,
information indicating whether a value of a parameter, received from another wireless node and relating to the priority level, is accepted or rejected,
a measurement,
capability information,
information identifying a limitation of the control node or the target wireless node, or
scheduling information for determining the priority level.

14. The method of claim 1, wherein the priority level is determined based at least in part on the first signal or the second signal being a high-priority or low-latency transmission.

15. The method of claim 1, wherein the priority level is determined based at least in part on received information indicating that a default priority level or rule for determining the priority level is overridden.

16. A control node for wireless communication, comprising;
a memory; and
one or more processors coupled to the memory, the memory and the one or more processors configured to:
determine at least one of a transmission power or a reception power for at least one of a first signal or a second signal to be communicated between a target wireless node and at least one other wireless node based at least in part on a priority level of the first signal relative to the second signal,
wherein the transmission power or the reception power is based at least in part on at least one of an identity or state of the target wireless node or the at least one other wireless node, or a type of the first signal or the second signal, and
wherein the priority level is determined based at least in part on information specifying a priority level of the control node or the target wireless node, the priority level of the control node or the target wireless node being based at least in part on at least one of a hop count associated with the control node, a resource partitioning configuration of the control node, a capability of the control node or the target wireless node, a mobility state of the control node or the target wireless node, or a topological state of the control node or the target wireless node; and
configure the transmission power or the reception power to be used for the first signal or the second signal.

17. A control node for wireless communication, comprising;
a memory; and
one or more processors coupled to the memory, the memory and the one or more processors configured to:
determine at least one of a transmission power or a reception power for at least one of a first signal or a second signal to be communicated between a target wireless node and at least one other wireless node based at least in part on a priority level of the first signal relative to the second signal,
wherein the transmission power or the reception power is based at least in part on at least one of an identity or state of the target wireless node or the at least one other wireless node, or a type of the first signal or the second signal;
configure the transmission power or the reception power to be used for the first signal or the second signal; and
receive the received signaling from at least one of an upper layer of a network, another wireless node, or a central unit or a 5G network controller, wherein the priority level is based at least in part on the received signaling.

18. The control node of claim 17, wherein the priority level is determined based at least in part on received information indicating that a default priority level or rule for determining the priority level is overridden.

19. The control node of claim 17, wherein the one or more processors are further configured to:
provide information for identifying the priority level to at least one of:
the upper layer of the network,
the at least one other wireless node, or
the central unit or the 5G network controller.

20. The control node of claim 19, wherein the information for identifying the priority level identifies at least one of:
a value of a parameter relating to the priority level,
a suggested value of the parameter relating to the priority level,
a requested value of the parameter relating to the priority level,
information indicating whether a value of a parameter, received from another wireless node and relating to the priority level, is accepted or rejected,
a measurement,
capability information,
information identifying a limitation of the control node or the target wireless node, or
scheduling information for determining the priority level.

21. The control node of claim 17, wherein the priority level is determined based at least in part on the first signal or the second signal being a high-priority or low-latency transmission.

22. A method of wireless communication performed by a control node, comprising:
determining at least one of a transmission power or a reception power for at least one of a first signal or a second signal to be communicated between a target wireless node and at least one other wireless node based at least in part on a priority level of the first signal relative to the second signal,
wherein the transmission power or the reception power is based at least in part on at least one of an identity or state of the target wireless node or the at least one other wireless node, or a type of the first signal or the second signal, and wherein the priority level is determined based at least in part on information specifying a priority level of the control node or the target wireless node, the priority level of the control node or the target wireless node being based at least in part on at least one of a hop count associated with the control node, a resource partitioning configuration of the control node, a capability of the control node or the target wireless node, a mobility state of the control node or the target wireless node, or a topological state of the control node or the target wireless node; and configuring the transmission power or the reception power to be used for the first signal or the second signal.

23. A non-transitory computer-readable medium storing instructions, the instructions comprising:

one or more instructions that, when executed by one or more processors of a control node for wireless communication, cause the one or more processors to:

determine at least one of a transmission power or a reception power for at least one of a first signal or a second signal to be communicated between a target wireless node and at least one other wireless node based at least in part on a priority level of the first signal relative to the second signal, wherein the transmission power or the reception power is based at least in part on at least one of an identity or state of the target wireless node or the at least one other wireless node, or a type of the first signal or the second signal, and wherein the priority level is determined based at least in part on information specifying a priority level of the control node or the target wireless node, the priority level of the control node or the target wireless node being based at least in part on at least one of a hop count associated with the control node, a resource partitioning configuration of the control node, a capability of the control node or the target wireless node, a mobility state of the control node or the target wireless node, or a topological state of the control node or the target wireless node; and configure the transmission power or the reception power to be used for the first signal or the second signal.

24. The non-transitory computer-readable medium of claim 23, wherein the priority level is further determined based at least in part on a scheduling message, configuration information, or downlink control information for at least one of the first signal or the second signal.

25. The non-transitory computer-readable medium of claim 23, wherein the one or more instructions, when executed by the one or more processors, cause the one or more processors to:

provide control information that indicates the priority level.

26. The non-transitory computer-readable medium of claim 23, wherein the one or more instructions, when executed by the one or more processors, cause the one or more processors to:

receive control information; and determine the priority level further based at least in part on the control information.

27. The non-transitory computer-readable medium of claim 23, wherein the priority level is further determined based at least in part on a scheduling method associated with at least one of the first signal or the second signal.

28. An apparatus for wireless communication, comprising:

means for determining at least one of a transmission power or a reception power for at least one of a first signal or a second signal to be communicated between a target wireless node and at least one other wireless node based at least in part on a priority level of the first signal relative to the second signal, wherein the transmission power or the reception power is based at least in part on at least one of an identity or state of the target wireless node or the at least one other wireless node, or a type of the first signal or the second signal, and wherein the priority level is determined based at least in part on information specifying a priority level of the control node or the target wireless node, the priority level of the control node or the target wireless node being based at least in part on at least one of a hop count associated with the control node, a resource partitioning configuration of the control node, a capability of the control node or the target wireless node, a mobility state of the control node or the target wireless node, or a topological state of the control node or the target wireless node; and means for configuring the transmission power or the reception power to be used for the first signal or the second signal.

29. The apparatus of claim 28, further comprising:

means for adjusting a receiver configuration, wherein the receiver configuration relates to at least one of:

a receiver power configuration, a low noise amplifier gain configuration, a receiver filter configuration, an analog beamforming configuration, or a digital beamforming configuration.

* * * * *